United States Patent [19]
Sulzbach et al.

[11] Patent Number: 6,127,442
[45] Date of Patent: Oct. 3, 2000

[54] PROCESS FOR FOAM PRODUCTION USING DISSOLVED UNDER PRESSURE CARBON DIOXIDE

[75] Inventors: Hans-Michael Sulzbach; Herbert Steilen, both of Königswinter; Reiner Raffel, Siegburg; Robert Eiben, Lampertheim; Wilfried Ebeling, Köln, all of Germany

[73] Assignees: Hennecke GmbH; Bayer Aktiengesellschaft, both of Leverkusen, Germany

[21] Appl. No.: 09/194,784

[22] PCT Filed: May 26, 1997

[86] PCT No.: PCT/EP97/02688

§ 371 Date: Dec. 3, 1998

§ 102(e) Date: Dec. 3, 1998

[87] PCT Pub. No.: WO97/47453

PCT Pub. Date: Dec. 18, 1997

[30] Foreign Application Priority Data

Jun. 7, 1996 [DE] Germany .......................... 196 22 742

[51] Int. Cl.$^7$ .................................................. C08G 18/14
[52] U.S. Cl. .......................... 521/130; 521/133; 521/155; 521/170
[58] Field of Search .................................. 521/130, 133, 521/155, 170

[56] References Cited

U.S. PATENT DOCUMENTS

| | | | |
|---|---|---|---|
| 3,181,199 | 5/1965 | Voelker . | |
| 3,184,419 | 5/1965 | Merriman . | |
| 5,055,272 | 10/1991 | Wheeler et al. | 422/133 |
| 5,118,720 | 6/1992 | Wheeler et al. | 521/99 |
| 5,620,710 | 4/1997 | Fiorentine et al. | 425/4 C |
| 5,639,483 | 6/1997 | Fiorentini et al. | 425/4 C |
| 5,665,287 | 9/1997 | Fiorentini et al. | 264/53 |

FOREIGN PATENT DOCUMENTS

| | | |
|---|---|---|
| 0 722 975 | 11/1995 | European Pat. Off. . |
| 803771 | 10/1958 | United Kingdom . |
| 96/00644 | 1/1996 | WIPO . |

OTHER PUBLICATIONS

J.B. Blackwell et al, Comparison of the VPF and Liquid $CO_2$ Foaming Processes, Cellular Polymers, Vo. 15, No. 2, Jan. 1, 1996, pp. 105–116.

*Primary Examiner*—John M. Cooney, Jr.
*Attorney, Agent, or Firm*—Joseph C. Gil; Lyndanne M. Whalen; Noland J. Cheung

[57] ABSTRACT

A process is described for the continuous production of polyurethane block foam using carbon dioxide which is physically dissolved under pressure as a foaming agent, wherein before the polyol and isocyanate components are mixed the carbon dioxide is dissolved in the polyol component and air or nitrogen is dissolved in the isocyanate component, both components are fed to a mixing chamber in which a pressure prevails which is 70 to 150% of the solution pressure of the $CO_2$ in the polyol component, the isocyanate component is fed to the mixing chamber at a pressure of at least 30 bar and is injected therein with depressurization down to the mixing chamber pressure, wherein air or nitrogen in an amount of at least 1 g per kg $CO_2$ is dissolved in the isocyanate component, and after emerging from the mixing chamber the mixture is depressurization to atmospheric pressure.

5 Claims, 3 Drawing Sheets

PROCESS FOR FOAM PRODUCTION USING DISSOLVED UNDER PRESSURE CARBON DIOXIDE

FIELD OF THE INVENTION

The present invention relates to a process and an apparatus for the production of foams by means of carbon dioxide dissolved under pressure as a foaming agent, wherein the composition to be foamed is mixed under pressure with what is preferably liquid carbon dioxide and is subsequently depressurised with the formation of foam. Liquid starting materials for plastics, which harden to form the foamed plastic due to an addition polymerisation or condensation polymerisation reaction which sets in after foaming, are used in particular as the foamable compositions. This invention relates in particular to polyurethane foamed materials.

BACKGROUND OF THE INVENTION

The use of physically dissolved carbon dioxide as a foaming agent in the production of polyurethane foams is known from GB-A 803 771, U.S. Pat. No. 3,181,199 and U.S. Pat. No. 3,184,419. However, these known, prior proposals have not resulted in an industrial use, since the foam structure produced was very non-uniform; in particular, the foam comprised large voids. The reason for this is considered to be that the dissolved carbon dioxide has a pronounced tendency to remain in solution, even when the mixture which reacts to form polyurethane is supersaturated with carbon dioxide. In order to release the carbon dioxide during or after depressurisation it is necessary to provide seed bubbles which promote the controlled release of the carbon dioxide during depressurisation.

This problem is also known to occur when other foaming agents are used, such as low molecular weight hydrocarbons, chlorofluorocarbons, methylene chloride or water (chemical evolution of carbon dioxide by the reaction of the isocyanate with water). In these situations, bubble seeds have been provided by dispersing finely distributed air and/or nitrogen in at least one of the components of the mixture which reacts to form polyurethane.

When carbon dioxide which is physically dissolved under pressure is used as the foaming agent, it has similarly been proposed according to EP-A 645 226 that a nitrogen be introduced as a nucleating gas into the mixing chamber for the polyol and isocyanate components. In the course of this procedure, the amount of nitrogen has to be increased compared with conventional mixing processes which operate substantially at normal pressure, so that it corresponds to the prevailing pressure. However, polyurethane foams produced in this manner still have an unsatisfactory foam structure, apparently because the seed bubble structure is not sufficiently fine and uniform.

It has also been proposed according to DE-A 44 22 568.7 that high shearing forces be produced at the depressurisation element for nucleating the release of $CO_2$. Even though very good grades of foam are obtained according to this proposal using high carbon dioxide contents between 4 and 6% by weight and with depressurisation from a correspondingly high pressure, at lower carbon dioxide contents in the reactive mixture the supersaturation of the reactive mixture which is produced on depressurisation is not sufficient to provide uniformly good grades of foam by means of high shearing forces. Another disadvantage is that the mixing chamber pressure has to be maintained very closely above the solution pressure of the carbon dioxide, which constitutes an obstacle to a volume flow control procedure.

SUMMARY OF THE INVENTION

The object of the present invention is to improve the foam qualities of multi-component foamed materials using carbon dioxide dissolved under pressure, by producing a very uniform bubble seed structure.

It has been found that the mixing chamber pressure can be varied within wide limits, in the interest of effecting mass flow control of the components, if air or nitrogen is firstly dissolved as a nucleating agent in one of the (main) components and carbon dioxide is secondly dissolved in the other (main) component, and if the component containing the nucleating agent is injected under high pressure into the component containing carbon dioxide.

DETAILED DESCRIPTION OF THE INVENTION

Figure 1:
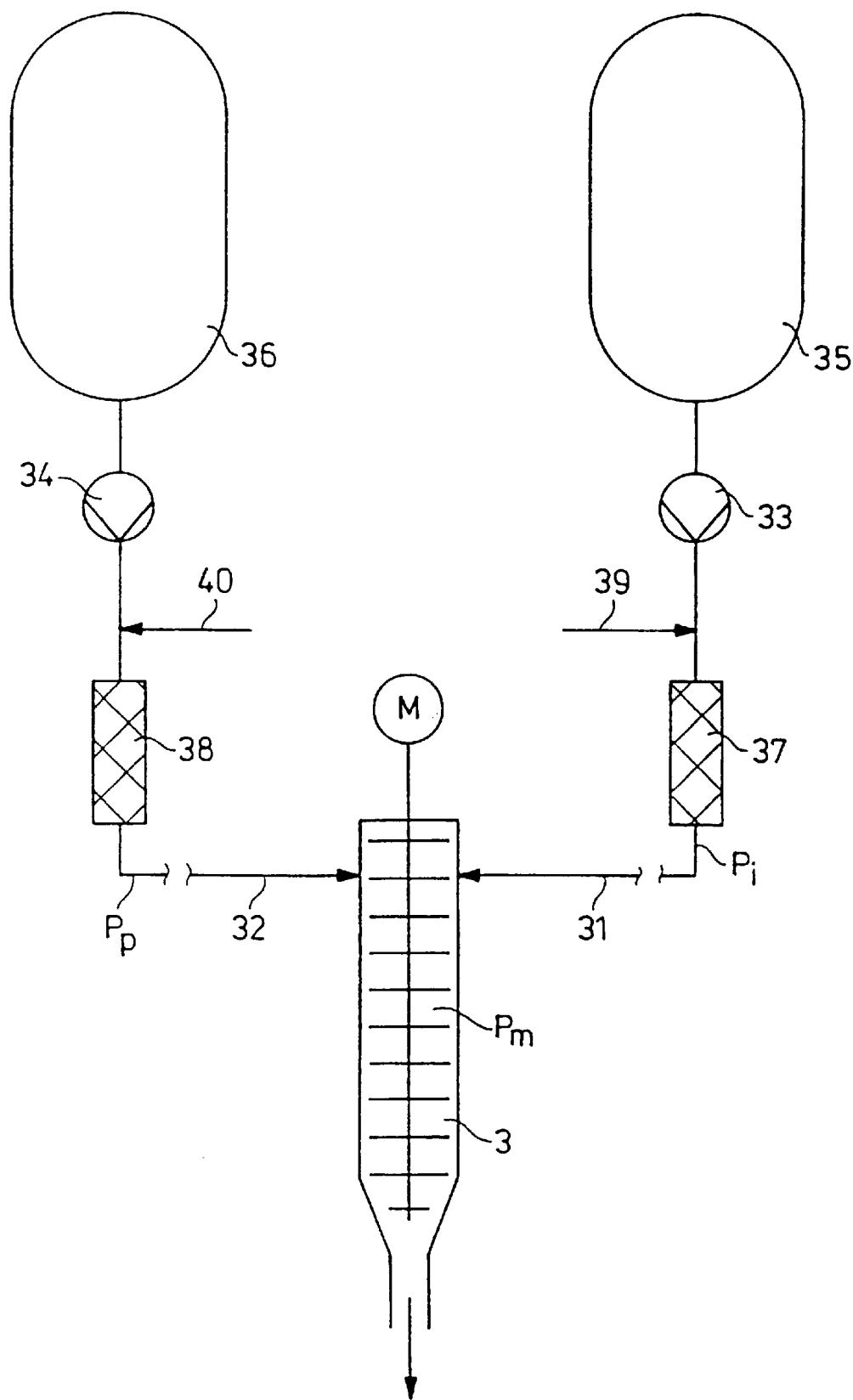
FIG. 1 shows a diagram of the process of the present invention.

The present invention accordingly relates to a process for the continuous production of polyurethane block foam using carbon dioxide which is physically dissolved under pressure as a foaming agent, wherein before the polyol and isocyanate components are mixed, the carbon dioxide is dissolved in the polyol component and air or nitrogen is dissolved in the isocyanate component, both components are fed to a mixing chamber in which a pressure prevails which is 70 to 150%, preferably 80 to 130%, of the solution pressure of the $CO_2$ in the polyol component, the isocyanate component is fed to the mixing chamber at a pressure of at least 10 bars above the pressure prevailing in the mixing chamber, and is injected therein with depressurisation down to the mixing chamber pressure, wherein air or nitrogen in an amount of at least 1 g, preferably 3 to 6 g per kg $CO_2$, is dissolved in the isocyanate component, and after emerging from the mixing chamber the mixture is depressurised to atmospheric pressure.

Preferably the pressure of the isocyanate component prior to introduction into the mixing chamber is above 30 bars, particularly preferred between 40 and 100 bars.

The amount of air dissolved in the isocyanate is preferably 4 to 6 g per kg $CO_2$; in the case of nitrogen it is 3 to 5 g per kg $CO_2$. The addition of air or nitrogen can be effected on the intake side of the metering pump. With large amounts of air or nitrogen, however, addition on the intake side results in metering problems at the isocyanate pump. In this situation, addition on the delivery side, i.e. downstream of the metering pump, is suitable, In this connection it is important that the distance between the static mixer and the mixing head iso-nozzle is long enough so that a dwell time results during which the air or nitrogen goes into solution completely.

Carbon dioxide is preferably used as the foaming agent in an amount of 1.5 to 6 parts by weight per 100 parts by weight polyol, corresponding to a mixing chamber pressure of about 4 to 30 bar. The solution partial pressure of $CO_2$ in the mixture is about 3 to 14 bar, and depending on the formulation, on the raw materials used, and on the proportions of air dissolved therein due to transport and storages variations of around 0.3 bar (at low $CO_2$ contents) to 2 bar (at high $CO_2$ contents) are possible. Since all of the carbon dioxide is introduced into the mixing chamber dissolved in the polyol component, the polyol pressure before its introduction into the mixing chamber is at least 5 bar (1.5 parts by weight $CO_2$) to at least 20 bar (6 parts by weight $CO_2$). Customary formulations, in which 50 to 65 parts by weight isocyanate are used for 100 parts by weight polyol, are assumed in this respect. In the event that the formulation is synthesised from prepolymer components, this results in different pressure ratios for the components and the mixture, corresponding to the mixture ratio of the components which is then necessary.

After mixing of the components is complete (assuming that the proportions of gas released in the bubble seeds are also dissolved), the sum of the solution partial pressures of carbon dioxide and air or nitrogen is less than the mixing chamber pressure. The bubble seeds produced on injecting the isocyanate into the mixing chamber are apparently not redissolved during the short dwell time of 1 to 2 seconds until the depressurisation of the reactive mixture to atmospheric pressure.

According to the invention, very uniform bubble seeds are produced in an amount of 250,000 to 500,000 per g of reactive mixture, with a seed bubble diameter between 10 and 30 g in the reactive mixture.

Outlet orifices which are of small cross-section in at least one dimension, such as apertures or perforated plates, and which impose a resistance to flow on the reactive mixture which is sufficient to maintain the mixing chamber pressure, are suitable as a depressurisation element for the depressurisation of the reactive mixture. A plurality of perforated plates disposed in series is preferred, wherein the perforated plates adjacent to the mixing chamber have a sufficiently small free cross-section for maintaining the mixing chamber pressure and at least one perforated plate is provided remote from the mixing chamber which has a considerably larger free cross-section for example, so that the outlet velocity of the reactive mixture is reduced on its passage through the last perforated plate. The invention is explained in more detail below with reference to the accompanying FIGS. 1 to 3.

FIG. 1 shows an agitating mixer head 3 which is customarily used in polyurethane foam technology, to which isocyanate from isocyanate supply vessel 35 and polyol from polyol supply vessel 36 are fed via lines 31 and 32, respectively. The isocyanate emerging from isocyanate supply vessel 35 is brought to a pressure of 95 bar, for example, via pressure pump 33. Before it enters the static mixer 37, the isocyanate is charged with air, as indicated by arrow 39, which is intimately mixed with the isocyanate in the static mixer. The inlet of isocyanate line 31 into the mixing chamber 3 is equipped with a nozzle by means of which the isocyanate is injected into the mixing chamber at a pressure $P_i$ of 90 bar, for example, and is depressurised to the mixing chamber pressure $P_m$ of 14 bar for example. The dwell time between the static mixer 37 and the mixing chamber injection is about 10 seconds. The polyol emerging from polyol supply vessel 36 is brought to a pressure of 30 bar, for example, by means of pressure pump 34. Liquid carbon dioxide which is cooled to $-20°$ C. is injected into the polyol line, as indicated by arrow 40, before the latter enters the static mixer 38, and is mixed in the static mixer 38. For example, the amount of carbon dioxide which is dissolved in the polyol upstream of the static mixer may be 4 parts by weight per 100 parts by weight polyol, corresponding to a solution partial pressure of 13 bar. The pressure $P_p$ in polyol feed line 32 is then about 20 to 23 bar.

When polyol line 32 enters the mixing chamber 3, the polyol is depressurised by means of a pressure relief valve to the mixing chamber pressure $P_m$ of 14 bar. Apart from carbon dioxide, the polyol may also contain about 4.5 parts by weight of water per 100 parts of polyol as an additional chemical foaming agent. According to one customary formulation, 60 parts of isocyanate are fed to the mixing chamber 3 per 100 parts of polyol, wherein the isocyanate may contain 0.33 g air/kg isocyanate.

Figure 2:
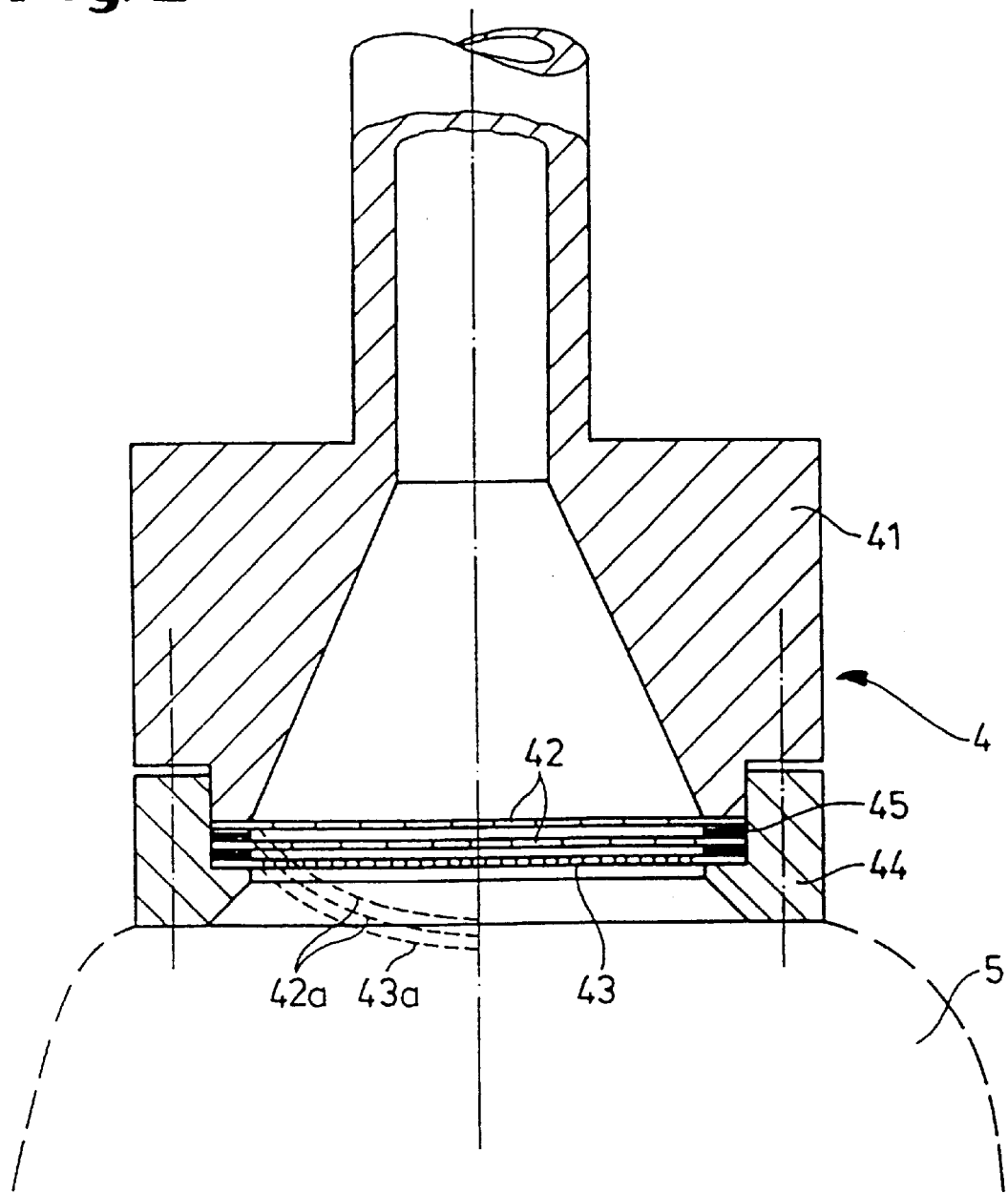
FIG. 2 shows a preferred embodiment of the depressurizing element of the present invention.

The depressurisation element for depressurising the reactive mixture to ambient pressure is disposed directly at the outlet of the mixing chamber 3. FIG. 2 shows a particularly preferred embodiment of the depressurisation element 4. This consists of a housing 41 which is closed by one or more perforated pressure plates 42, which comprise a multiplicity of holes with a diameter 0.1 to 0.2 mm, for example, wherein the free cross-sectional area of all the holes amounts to 1 to 5% of the plate area for example. A further perforated plate 43 is disposed upstream of the perforated pressure plates 42, and serves to reduce the velocity of the reactive mixture passing through the perforated pressure plates. The velocityreducing plate 43 also has holes with diameters of 0.1 to 0.2 mm, but the free cross-sectional area of all the throughholes amounts to 10 to 30%. The perforated plates are held by a retaining flange 44 and have spacer rings 45, so that they are at a spacing of 0.5 to 2 mm. The perforated plates 42 and 43 are preferably convex in the direction of flow as indicated by the dashed lines 42a and 43a. Directly it has passed through the perforated plates 42 and 43, the dissolved carbon dioxide is released in the bubble seeds produced in the mixing chamber. The reactive mixture thereby foams very strongly, as indicated by the foam contour 5.

Figure 3:
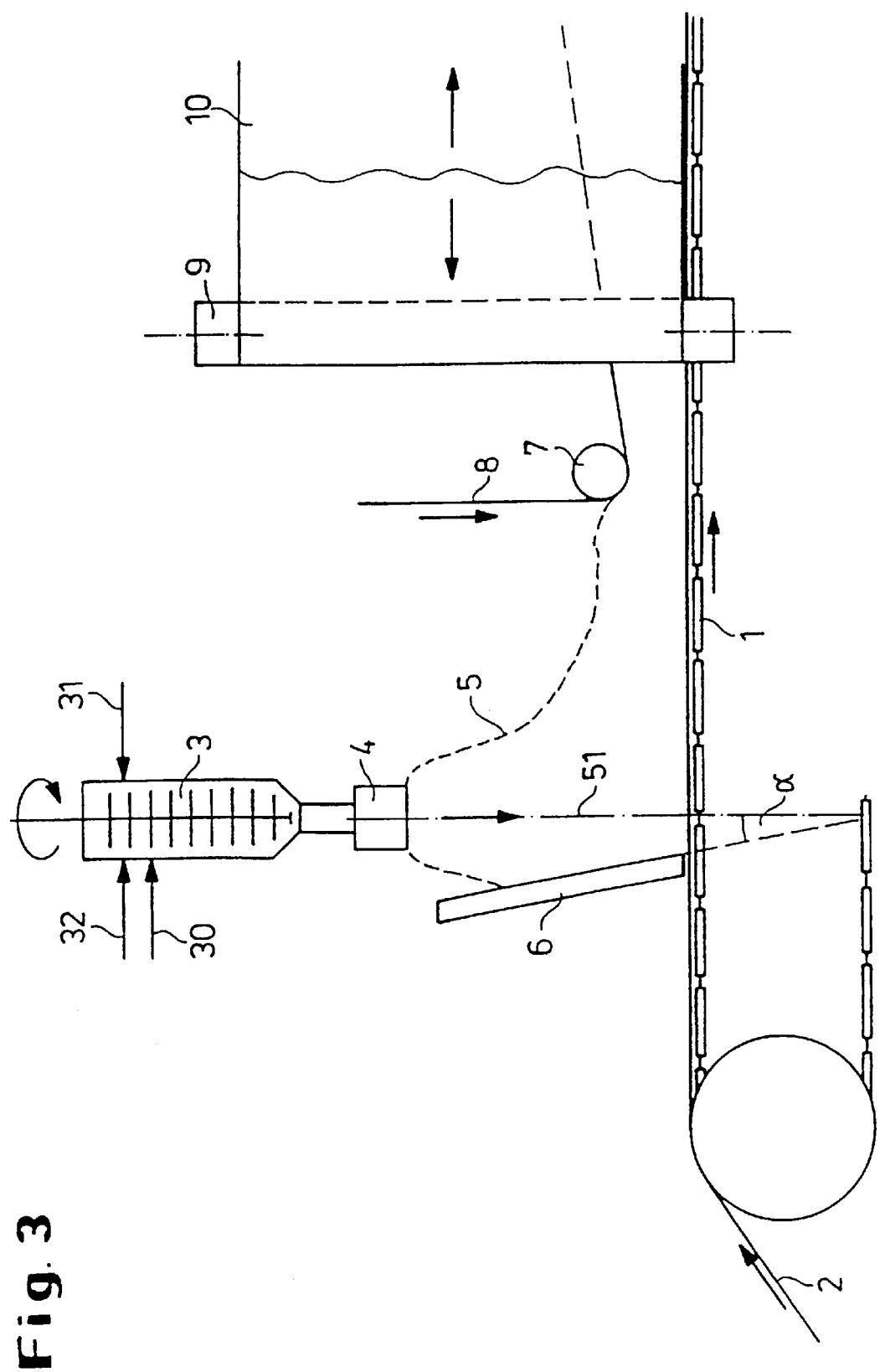
FIG. 3 shows a diagram of the process of the present invention for the continuous production of block foam.

FIG. 3 illustrates the process for the continuous production of block foam. The foam 5 emerging from the depressurisation device 4 is deposited on a lower laminating film 2 which travels in conjunction with the conveyor belt 1. A barrier 6 which is disposed transversely on the conveyor belt prevents the foam from flowing off in the opposite direction to that of the conveyor belt. The upper conveyor belt 8 is fed via a roller 7. Lateral rollers 9 serve to feed the lateral laminating film 10. It is also indicated that other auxiliary materials and modifying substances can be fed to the mixing head via an additional feed line 30.

With the formulation given in the description of FIG. 1, a very uniform foam is produced, which has a bulk density of 15 kg/m$^3$ and very uniform foam bubbles. The foam contains 18 foam bubbles/cm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of polyurethane block using carbon dioxide which is physically dissolved under pressure as a foaming agent, comprising the steps of dissolving the carbon dioxide in a polyol component and dissolving air or nitrogen in an isocyanate component before mixing said polyol and isocyanate components; feeding both said components into a mixing chamber in which a pressure prevails which is 70 to 150% of the solution pressure of the carbon dioxide in said polyol component; said isocyanate component is fed into said mixing chamber at a pressure of at least 10 bars above the pressure prevailing in said mixing chamber and is injected therein with depressurization down to the pressure of said mixing chamber; air or nitrogen in an amount of at least 1 g per kg of carbon dioxide is dissolved in said isocyanate component, and after emerging from said mixing chamber, said mixture is depressurized to atmospheric pressure.

2. A process according to claim 1, whereby 0.5 to 6 parts by weight of carbon dioxide, with respect to 100 parts by weight of polyol, are dissolved in the polyol component, and the mixing chamber pressure is 2 to 30 bar.

3. A process according to claim 1, whereby air in an amount of 4 to 6 g per kg $CO_2$ is dissolved in the isocyanate component.

4. A process according to claim 1, whereby a pressure prevails in the mixing chamber which corresponds to 80 to 130% of the solution pressure of the $CO_2$ in the polyol component.

5. A process according to of claim 1, whereby 2 to 6 parts by weight of carbon dioxide, with respect to 100 parts by weight of polyol, are dissolved in the polyol component.

* * * * *